No. 671,075. Patented Apr. 2, 1901.
T. WHITE.
PHOTOGRAPHIC PRINT WASHER.
(Application filed Aug. 9, 1900.)
(No Model.)
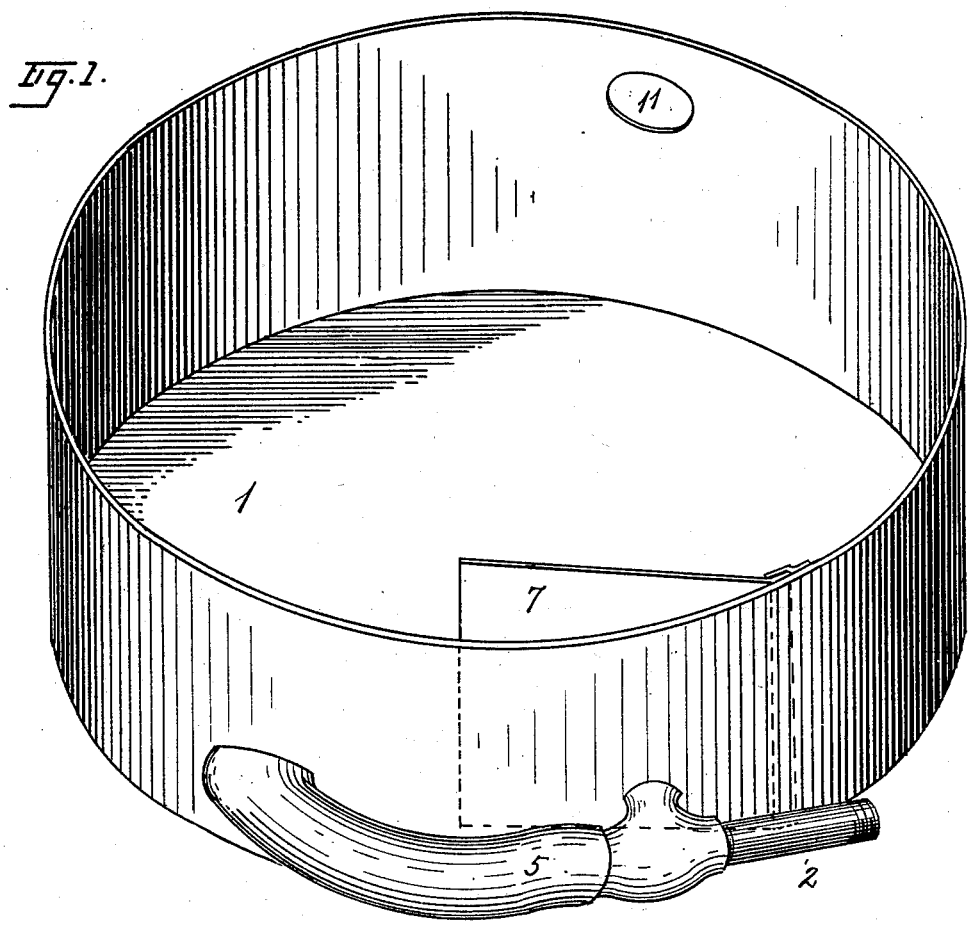
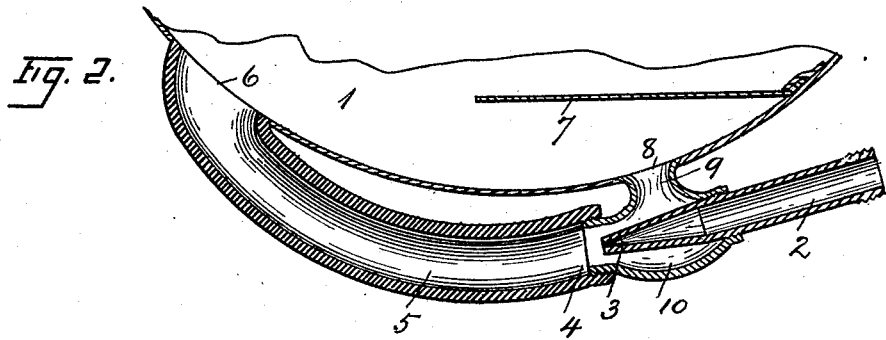
WITNESSES:
INVENTOR.
Thomas White
BY
Francis M. Wright,
ATTORNEY.

UNITED STATES PATENT OFFICE.

THOMAS WHITE, OF VALLEJO, CALIFORNIA.

PHOTOGRAPHIC-PRINT WASHER.

SPECIFICATION forming part of Letters Patent No. 671,075, dated April 2, 1901.

Application filed August 9, 1900. Serial No. 26,450. (No model.)

*To all whom it may concern:*

Be it known that I, THOMAS WHITE, a citizen of the United States, residing at Vallejo, in the county of Solano and State of California, have invented certain new and useful Improvements in Photographic-Print Washers, of which the following is a specification.

My invention relates to improvements in photographic-print washers, the object of my invention being to provide a simple and economical device of this character by which the prints may be thoroughly washed without breaking or cracking them.

My invention therefore resides in the novel construction, combination, and arrangement of parts for the above ends hereinafter fully specified, and particularly pointed out in the claims.

In the accompanying drawings, Figure 1 is a perspective view of the device, and Fig. 2 is a horizontal section through the nozzle.

Referring to the drawings, 1 represents a cylindrical vessel in which the prints to be washed are laid flat upon the water therein. The water is supplied through a short pipe 2, having a nozzle 3, which pipe may be connected by means of its threaded end and a flexible pipe (not shown) with any suitable source of supply of water under pressure. The nozzle 3 discharges into the mouth 4 of a pipe 5 and said pipe leads to an orifice 6 in the side of the vessel. The water thus entering the vessel travels around the same; but its rotary motion is interrupted by a wall 7, extending obliquely inward from the side of the vessel, and the water is thus directed toward the center by said wall.

The side of the vessel behind the wall 7 is apertured, as at 8, said aperture being connected by a conduit 9 with a chamber 10 around the nozzle 3. The effect of this construction is that the jet of pressure-water through the pipe 2 and nozzle 3 injects into the pipe 5 water drawn through the aperture 8 and conduit 9, and thus creates a backflow or eddy around the vertical edge of the wall 7 and toward the aperture 8. Thus this eddy also has the effect of breaking up the rotary movement of the water in the vessel and continually brings fresh water into contact with the prints to wash the same. The overflow water escapes through an aperture 11 at a suitable height in the side of the vessel.

The advantages of the above construction are that the water enters the vessel in considerable volume, but without violence, the pressure of the water in the jet being reduced by its mixture with the water drawn in from the vessel through the conduit 9. Less water is needed, being only that of a small jet, instead of a full-sized pipe, and the prints are not bent or distorted by the inflowing water, which, approaching them in large volume, but without violence, shoots in between the prints and separates them, dividing up the stream of water and thoroughly washing the prints.

I claim—

1. A photographic-print washer, comprising a cylindrical vessel, an inlet-pipe discharging obliquely through the curved side of the vessel, and a wall extending inwardly and obliquely from said curved side, said side having a suitable overflow-aperture, substantially as described.

2. A photographic-print washer, comprising a cylindrical vessel, an inlet-pipe discharging obliquely through the curved side of the vessel, a conduit leading from the vessel to said inlet-pipe, and a nozzle at the junction of said conduit and pipe, directed into said pipe, substantially as described.

3. A photographic-print washer, comprising a cylindrical vessel, an inlet-pipe discharging obliquely through the curved side of the vessel to said inlet-pipe, a nozzle directed into said pipe, and a wall extending inwardly and obliquely from said curved side into said vessel, substantially as described.

In witness whereof I have hereunto set my hand in the presence of two subscribing witnesses.

THOMAS WHITE.

Witnesses:
 WILLIAM ROBINSON,
 THOMAS D. JONES.